Aug. 16, 1927.
W. E. WILLIAMS
1,639,322
DISK WHEEL AND RIM THEREFOR
Filed Dec. 13, 1922
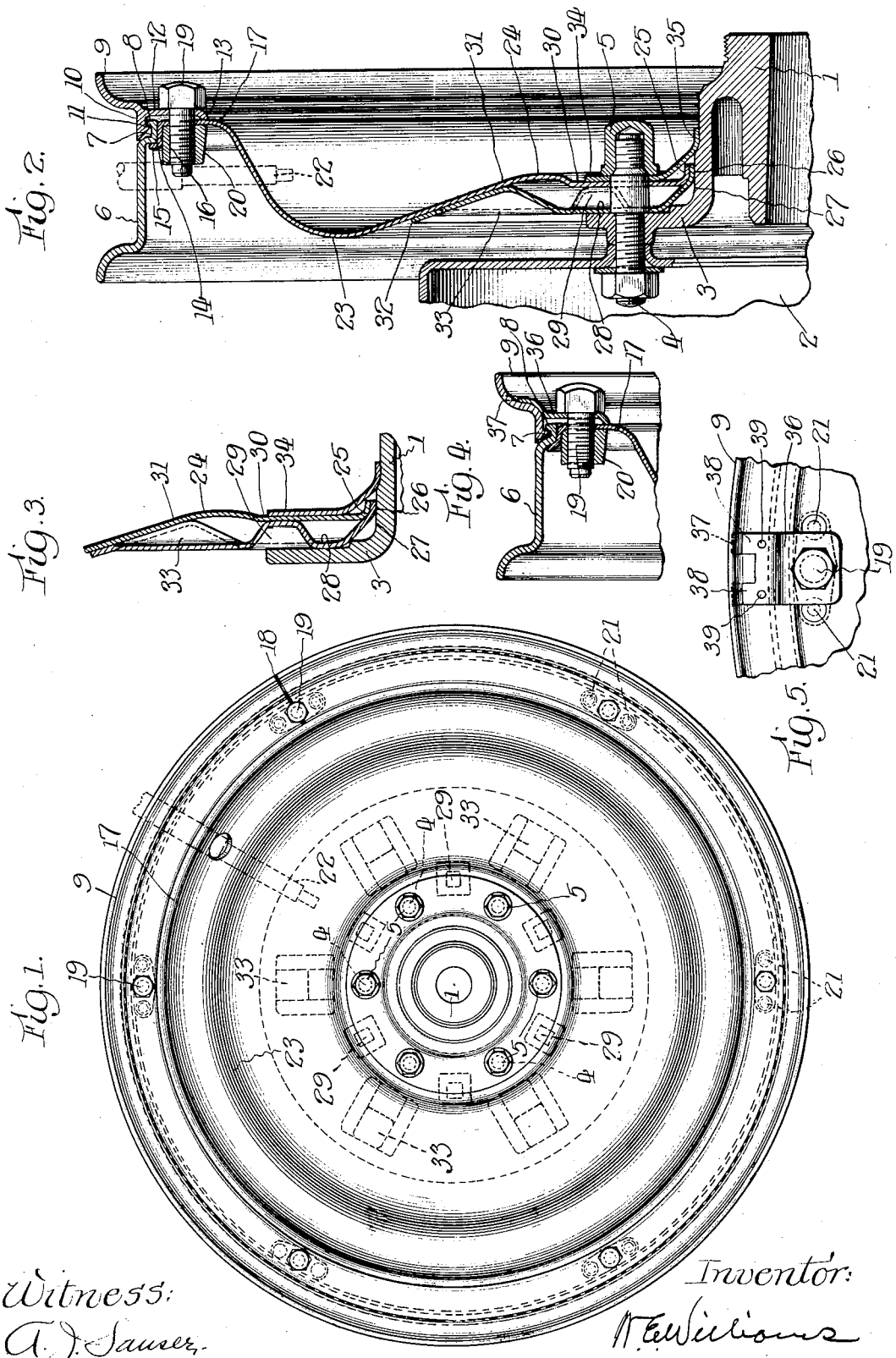

Patented Aug. 16, 1927.

1,639,322

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

DISK WHEEL AND RIM THEREFOR.

Application filed December 13, 1922. Serial No. 606,624.

The object of my invention is to provide a disk wheel having certain desirable features as to the disk itself and a rim for a pneumatic tire especially adapted for disk wheels, the detail merits of which are herein set forth.

Reference will be had to the accompanying drawing, on which Figure 1 is a front elevation of the wheel.

Figure 2 is the side sectional elevation.

Figure 3 is a section through a portion of the hub connection.

Figure 4 is a transverse section of a modified form of the rim connection.

Figure 5 is a front elevation of the portions shown in Figure 4.

In the drawing 1 indicates the hub of an automobile wheel here shown as the rear hub, 2 indicates the brake drum, 3 indicates the integral flange of the hub and 4 indicates a series of stud bolts adapted to bolt the brake drum to the hub flange and also to bolt the disk to the hub. These bolts are provided with the hub nuts 5, for making a demountable fastening for the disk with the hub.

The web of the wheel consists of a main front disk, reinforced on the back by a circular reinforcing disk which extends only part way from the hub to the rim.

The rim of the wheel is of the type known, suitable for a straight side tire and is composed of the main rim portion 6 having a gutter or groove 7 which has a marginal flange 8 and in this gutter there is seated the detachable side flange 9 through the medium of the annular projection 11 of the bead seat 10 of the said side ring 9.

The side ring 9 is provided with the inwardly extending flange 12 which terminates in the curved edge 13 bearing on the main disk of the web of the wheel.

The inside portion of the gutter 7 forms an inward projection 14 of the main rim portion 6 and this projection is opposed on the inside by the marginal flange 15 of the main disk and it rides directly in radial contact on the flange 16 of the main disk. This flange 16 is turned over from the felloe portion 17 of the main disk.

The side ring 9 is cut asunder at 18 and is what is known as a split ring and the flange 12 of the ring is pierced at suitable points for clamping bolts 19 which pass through and are secured into fixed nuts 20 fixed to the main disk in any suitable manner but shown as rivets 21 through flanges on the nuts 20 and thus the screws 19 not only hold the rim 6 together with its side flange 9 on to its seat on the disk but also serve to hold the side ring 9 from being dislodged when the wheel is in service.

In some instances rims having side rings held in place without a positive lock have been known to become dislodged in service but with the construction here shown this sort of an accident may not happen.

From the felloe face 17 of the main disk the metal of the disk curves inward, to allow for a clearance of the valve stem of the pneumatic tire shown in dotted lines and indicated by 22 thus forming the bulge 23 on the inside of the main disk.

The front face of the main disk in the hub zone is indicated by 24 and extends down to a small marginal flange 25 which is seated on a small marginal flange 26 of the reinforcing disk and the latter rests on the barrel portion 27 of the hub. The reinforcing disk and the main disk are spot welded through the flanges 25 and 26 thus becoming at this point substantially a unitary member.

The reinforcing disk extends outwardly along the integral flange 3 of the hub as indicated by portion 28 and this portion is stiffened in spots by a series of depressions 29 which extend inward and in contact with the surface 30 of the main disk. The reinforcing disk extends radially and outwrdly to contact with the main disk as indicated by 31 and thence follows the main disk to the margin 32 of the reinforcing disk. A series of corrugations 33 shown in dotted lines in Figure 1 stiffen the reinforcing disk substantially from the hub flange to the margin of the reinforcing disk.

The clamping ring or hub flange 34 is provided and interposed between the nuts 5 in order to help transmit the load from bolt to bolt at the hub fastening. This hub flange 34 has an annular flange 35 bearing on the hub barrel.

Thus the depressions 29 and the connections between the two disks at their flanges 25 and 26 serve to resist the thrust or compressions of the stud bolts 4 under the influence of the nuts 5.

The margin of the reinforcing disk at 32, the depressions 29 and flanges 25 and 26 are welded as desired to the main reinforcing disk at the points of contact therewith.

In place of having the flange 12 and the side ring 9 integral I get a good result by securing to the flange a series of lugs shown as 36 in Figures 4 and 5. In order to fasten the lugs 36 with security I perforate the side ring 9 as indicated in dotted lines by 37 then fit into these perforations the projections 38 of the lugs 36. In addition to fastening the lugs 36 in this manner I spot weld or rivet the parts together as indicated by the spots 39.

While with ordinary constructions, there is little danger that the air pressure alone will force the side ring off, yet such accidents sometimes occur with serious results when the tire is on the wheel and in service. With my method of fastening the demountable rim and the side ring together on to the wheel I get a more secure fastening than is ordinarily obtained by any other means.

In holding the rim on to the wheel in a demountable rim fashion a clamping ring is frequently used which ring has its outer margin in contact with the side of the rim and its inner margin bearing on the felloe face of the wheel. By making my side ring 9 with its flange 12 I roll in one piece the side ring and clamping flanges and thus save the labor operations of making and handling an extra piece of the wheel equipment which is a desideratum.

By constructing the rim with its parts as described and supporting it on the margin of the disk as shown I make a lighter total assembly for the wheel than has heretofore been obtained in any wheel that approaches the desirable mechanical features, and the fastening of the reinforcing disk to the main disk and stiffening it by the depressions and flanges as described, makes a light, strong, and desirable structure.

What I claim is:—

1. In a device of the class described a rim structure having a main rim portion and side ring portion, the two portions held together by interlocking flanges, one of the portions being split and sprung into engagement with the other and an inward projecting part of one of the rim portions adapted to serve in securing the rim to a wheel and also in securing the parts themselves together.

2. In a device of the class described a rim having a main portion with a gutter on one edge adapted to seat and carry a snap side ring, the snap side ring seated in the said gutter and carrying one flange for retaining a pneumatic tire and an additional internally extending flange adapted to serve as part of the fastening device of the rim on the wheel body.

3. In a device of the class described a demountable rim having a snap ring forming one side flange of the rim, a projection on the said snap ring extending into the felloe region of the wheel and means passing through the said inwardly extending projection and adapted to hold the rim on to the wheel body through the medium of the said inwardly extending projection of the side ring.

4. In a device of the class described a rim having a split snap side ring and said side ring having an inwardly extending portion adapted for use in clamping the assembled rim on the wheel body.

5. In a tire rim including a detachable snap ring, a portion of the snap ring extending inwardly into the felloe region of a wheel and perforated for the passage of a fastening bolt adapted to hold the assembled rim on to the wheel body.

Signed at Chicago, in the county of Cook and State of Illinois, this 16th day of October, 1922.

WILLIAM ERASTUS WILLIAMS.

CERTIFICATE OF CORRECTION

Patent No. 1,639,322. Granted August 16, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.